United States Patent [19]

Vuarnesson

[11] Patent Number: 5,003,698
[45] Date of Patent: Apr. 2, 1991

[54] APPARATUS FOR VIEWING A REPRESENTATION OF THE CELESTIAL VAULT

[76] Inventor: Bernard Vuarnesson, 1 Blvd. St. Michel, 75006 Paris, France

[21] Appl. No.: 517,302

[22] Filed: May 1, 1990

[30] Foreign Application Priority Data

May 5, 1989 [FR] France .............................. 89 05996

[51] Int. Cl.⁵ .......................................... G01C 17/34
[52] U.S. Cl. ..................................... 33/268; 434/289; 40/363
[58] Field of Search ................. 33/268, 269, 270, 271; 434/284, 285, 287, 289; 40/362, 363, 364, 365, 366, 367

[56] References Cited

U.S. PATENT DOCUMENTS

| | | | |
|---|---|---|---|
| 1,182,384 | 5/1916 | Kennedy | 350/114 |
| 1,873,595 | 8/1932 | Johnson | 434/289 |
| 2,032,829 | 3/1936 | Bartky | 434/289 |

Primary Examiner—Harry N. Haroian
Attorney, Agent, or Firm—Alan H. Levine

[57] ABSTRACT

An apparatus for viewing a representation of the celestial vault including a tube bearing a ring of graduations that indicate the dates of the days of a year, and a tube bearing a ring of graduations that indicate the hours of a day. The tubes are axially aligned and rotatable with respect to each other about the axis. One tube contains a representation of the night sky, and the other contains an element, such as a lens, for viewing the representation. The tubes are separably joined so that they can be disassembled, each tube rotated end-over-end through 180°, and the tubes reassembled. In one condition of assembly, a sky representation of the northern hemisphere is used, and in the other condition of assembly, a sky representation of the southern hemisphere is used.

14 Claims, 3 Drawing Sheets

FIG_1

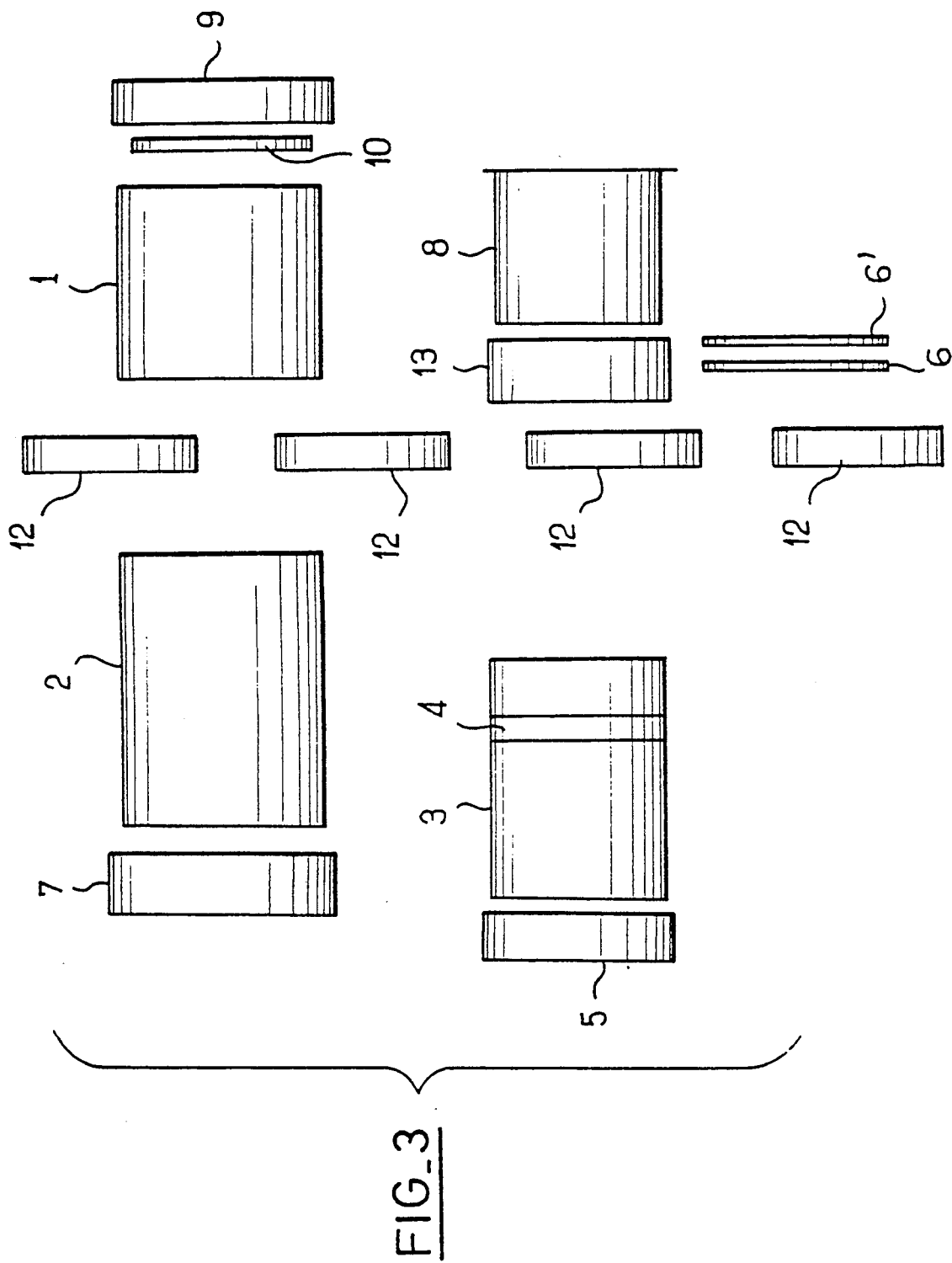
FIG_3

APPARATUS FOR VIEWING A REPRESENTATION OF THE CELESTIAL VAULT

The invention relates to an apparatus for observing a representation of the celestial vault.

Such an apparatus is known and consists of:

a first tube bearing on its outer face a ring of graduations indicating the dates of the days of a year.

means for assembling crosswise, within this first tube, a representation of the celestial vault;

a second tube bearing on its outer face a ring of graduations indicating the hours of a day;

means for installing in this second tube means for observing the celestial vault representation; and means for assembling the first tube and the second tube in alignment, with provision for relative rotation of the tubes with respect to the other.

This known apparatus has the disadvantage of not being universal, in that it is designed either for observing a representation of the sky visible only in the southern hemisphere or for observing a representation of the sky visible only in the northern hemisphere.

An object of the present invention is a universal apparatus, which allows either of these observations, as chosen by the user.

This goal is achieved, according to the invention, by providing means of assembling the apparatus in a way which permits dismantling of the apparatus followed by reassembly thereof after each tube has been turned upside down. In addition, the apparatus includes two representations of the sky, one of the southern hemisphere and one of the northern hemisphere.

An illustrative apparatus in accordance with the invention will be described below, with reference to the accompanying drawings, in which:

FIG. 3 is an exploded view of the apparatus parts, capable of being assembled to make up the apparatus of the invention.

Figure 1:
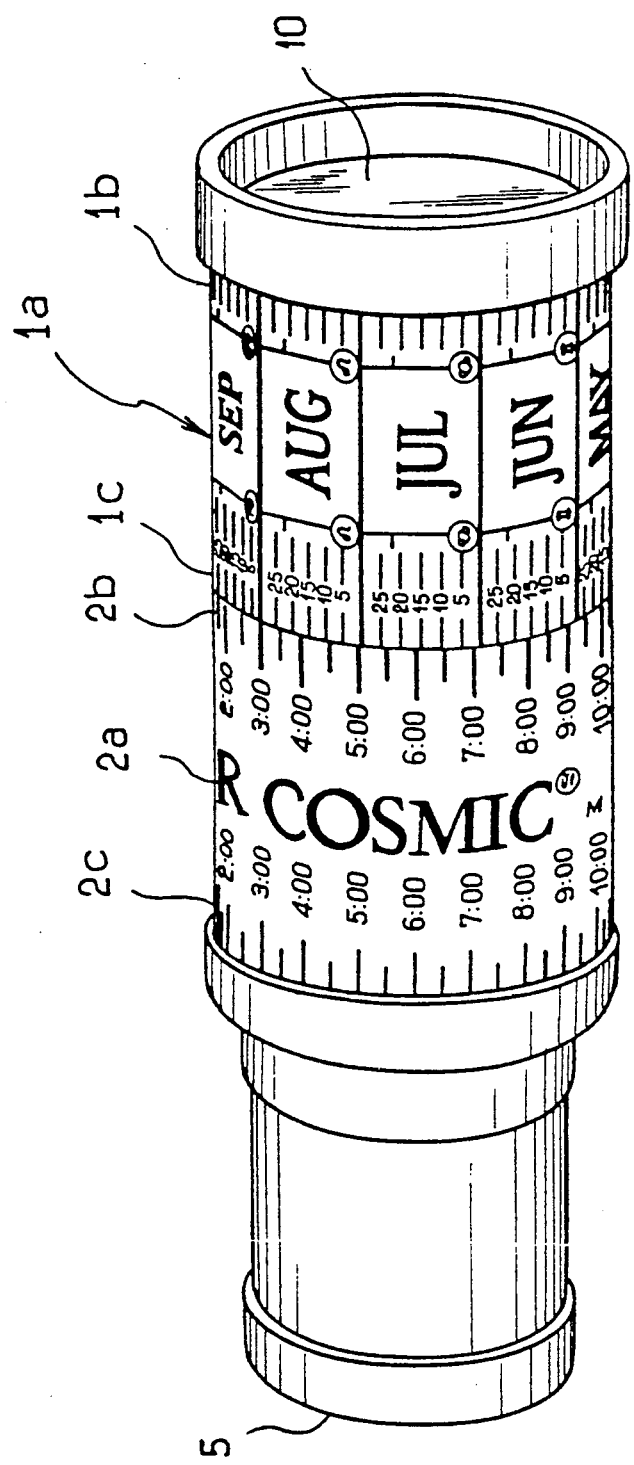
FIG. 1 is a perspective view of the apparatus

The apparatus chosen to illustrate the invention includes (FIGS. 1 and 2) a first tube 1 and a second tube 2. The first tube 1 has a circular (or, as a variant, polygonal) cross-section, which bears on its outer face 1a a peripheral scale with graduations in days. In this example, for legibility reasons, this scale is graduated in 5 day increments. The scale is present at each of the ends 1b and 1c of the tube, so as to be usable in each of the two possible positions of the tube, described below. Both ends 1b and 1c of the tube are identical, and are thinned out to form, starting from an inside shoulder, an edge with tabs.

The second tube 2, has a circular (or, as a variant, polygonal) cross-section, which bears on its outer face 2a a peripheral scale with graduations in hours. The scale is present at each of the ends 2b and 2c of the tube, so as to be usable in each of the two possible positions of the tube, described below. Both ends 2b and 2c of the tube are identical, and are thinned out to form, starting from an inside shoulder, an edge with tabs, adapted to fit into either of the edges with tabs of the first tube 1.

The invention is not limited to any particular method for allowing the assembly of both tubes in alignment, with provision for relative rotation between them. For example, as variants, an outer sleeve can be used into which the ends of tubes 1 and 2 are fitted, or an inner sheath can be used upon which these ends are joined.

Figure 2:
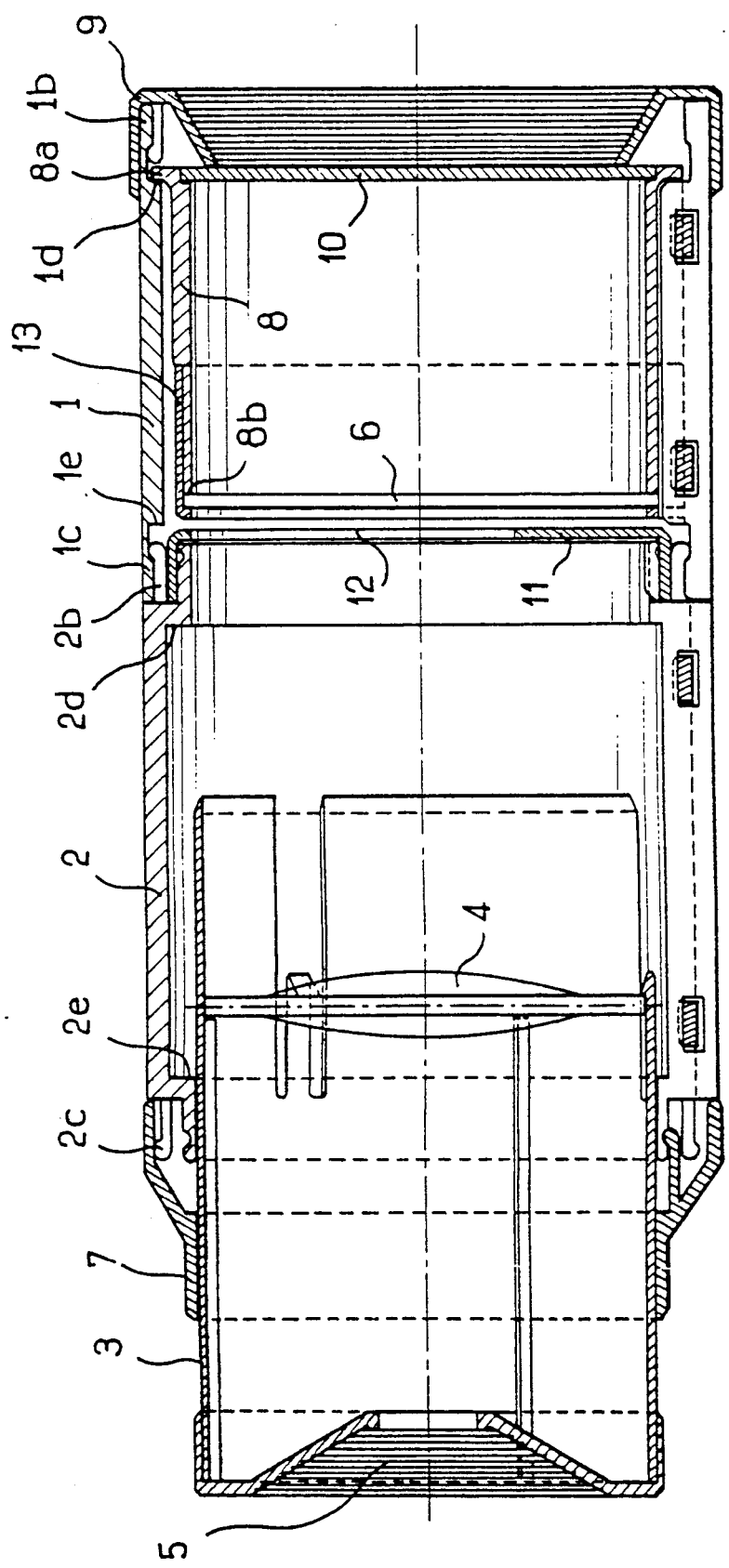
FIG. 2 is an axial cross-sectional view of the apparatus.

A cylindrical liner 3 (FIG. 2) is introduced by friction into the one of the ends of tube 2, in this case 2c, that is distant from tube 1. A lens, or group of lenses, 4 is installed inside the liner, and an eye-piece 5 is applied to its outer end. This liner 3 is able to slide within the tube 2 in order to focus on a disk 6, which bears a map of the sky and is mounted in the tube 1. The map is translucent, and may be in the nature of a photographic transparency. For strengthening purposes, the liner 3 is reinforced by a collar 7 engaging the liner and fitted upon the end 2c of tube 2. The disk 6 is mounted in tube 1 by means of a cylindrical liner 8, in which the disk is set up crosswise, for example, by wedging it between an end 8b of the liner and a collar 13. Disk 6 consists, for example, of a slide representing the map of the sky. The liner 8 is capable of frictionally sliding in tube 1 until stopped by flange 8a of the liner against the inner shoulder 1d formed in tube 1 at the base of the tabs 1b (FIG. 2). At its free end, tube 1 is capped by a collar 9, which carries a transverse translucent panel 10, which may be formed of ground glass or plastic.

Lastly, the apparatus includes a collar 11, which is fitted on to the end of tube 2 until it comes up against the inner shoulder formed at the base of the tabs. To make the fitting stronger, the end of the tube includes a double, concentric system of tabs. This collar carries a transverse panel that is equipped with a typically circular or elliptical aperture 12 chosen to limit the field of vision, as a function of the latitude of the observation site occupied by the user.

The apparatus assembled as shown in FIGS. 1 and 2 is suitable for observation of the night sky in one hemisphere. For observing night sky in the other hemisphere, liners 3 and 8 and collars 7, 9, and 10 are disassembled, tubes 1 and 2 rotated end-over-end 180°, and the collars and the liners reassembled with the map of the sky of the other hemisphere.

In practice, according to the invention, the apparatus can be supplied as a "kit", totally or partially unassembled. Typically, an unassembled set includes the following parts (FIG. 3):

one tube 1,
one tube 2,
one liner 3 equipped with lenses 4,
one eye-piece 5,
one collar 7,
one liner 8,
two maps 6 and 6' (respectively representing a map of the sky seen in the southern hemisphere and a map of the sky seen in the northern hemisphere),
one collar 13,
collar 9 with a translucent, e.g., ground glass or plastic, panel 10,
a set of collars 11 corresponding to various latitudes.

Some of the parts may be unassembled, or assembled in advance, as desired. In FIG. 3, which is a simple diagram, the relative proportions of the parts do not necessarily correspond to reality.

The invention is not limited to the embodiments which have been described.

I claim:

1. Apparatus for viewing a representation of the celestial vault comprising:

a first tube and a second tube, one of the tubes bearing along a periphery of its outer face a scale of graduations in days of a year, the other of the tubes bearing along a periphery of its outer face a scale of graduations in hours of a day, the tubes being axially aligned and rotatable with respect to each other about the tube axes, a representation of the night sky in the northern hemisphere and another representation of the night sky in the southern hemisphere, means within the first tube for removably supporting one of the representations cross-wise within the tube, means within the second tube for viewing the representation, and means for separably joining the tubes together so that optionally one end of the first tube is adjacent to one end of the second tube, or the other end of the first tube is adjacent to the other end of the second tube.

2. Apparatus as defined in claim 1 wherein the tubes have a cylindrical cross-section.

3. Apparatus as defined in claim 1 wherein the tubes have a polygonal cross-section.

4. Apparatus as defined in claim 1 wherein said means for viewing the representation includes a liner slidably insertable into the tubes through either end thereof, the liner carrying a transverse lens.

5. Apparatus as defined in claim 4 wherein said liner also carries an eyepiece applicable to an end of the liner.

6. Apparatus as defined in claim 1 wherein the means for supporting one of the representations includes a liner insertable into the second tube, the liner carrying one of the representations.

7. Apparatus as defined in claim 1 wherein said joining means includes means at each end of the first tube for engaging cooperable means at each end of the second tube, whereby either end of the first tube can be joined to either end of the second tube.

8. Apparatus as defined in claim 1 wherein the representations are translucent.

9. Apparatus as defined in claim 8 including a translucent panel at the end of the first tube opposite the end joined to the second tube.

10. Apparatus as defined in claim 9 including a collar, removably applicable to either end of the first tube, for securing the translucent panel to the tube.

11. Apparatus as defined in claim 1 including means within one of the tubes, between the representation and the viewing means, for limiting the area of the representation which can be seen.

12. Apparatus as defined in claim 11 wherein the limiting means includes a collar mountable on either end of the second tube.

13. Apparatus as defined in claim 11 wherein the limiting means includes a panel transverse to the tube within which it is located, the panel having an aperture through which the representation can be viewed.

14. Apparatus as defined in claim 13 including a plurality of limiting means, the size and shape of the apertures in the panels differing from each other and being related to different observation site latitudes.

* * * * *